United States Patent
Arimilli et al.

(10) Patent No.: US 7,475,196 B2
(45) Date of Patent: *Jan. 6, 2009

(54) PROCESSOR, DATA PROCESSING SYSTEM, AND METHOD FOR INITIALIZING A MEMORY BLOCK IN A DATA PROCESSING SYSTEM HAVING MULTIPLE COHERENCY DOMAINS

(75) Inventors: Ravi K. Arimilli, Austin, TX (US); Guy L. Guthrie, Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 241 days.

This patent is subject to a terminal disclaimer.

(21) Appl. No.: 11/388,001

(22) Filed: Mar. 23, 2006

(65) Prior Publication Data

US 2007/0226423 A1 Sep. 27, 2007

(51) Int. Cl.
*G06F 13/00* (2006.01)
(52) U.S. Cl. ........................ 711/144; 711/119; 711/141; 711/156
(58) Field of Classification Search ........................ None
See application file for complete search history.

(56) References Cited

U.S. PATENT DOCUMENTS 5,852,716 A * 12/1998 Hagersten .................... 709/201

* cited by examiner

*Primary Examiner*—Reginald G Bragdon
*Assistant Examiner*—Shawn X Gu
(74) *Attorney, Agent, or Firm*—Diana R. Gerhardt; Dillon & Yudell LLP

(57) ABSTRACT

A data processing system includes at least first and second coherency domains, each including at least one processor core and a memory. In response to an initialization operation by a processor core that indicates a target memory block to be initialized, a cache memory in the first coherency domain determines a coherency state of the target memory block with respect to the cache memory. In response to the determination, the cache memory selects a scope of broadcast of an initialization request identifying the target memory block. A narrower scope including the first coherency domain and excluding the second coherency domain is selected in response to a determination of a first coherency state, and a broader scope including the first coherency domain and the second coherency domain is selected in response to a determination of a second coherency state. The cache memory then broadcasts an initialization request with the selected scope. In response to the initialization request, the target memory block is initialized within a memory of the data processing system to an initialization value.

19 Claims, 11 Drawing Sheets

PROCESSOR, DATA PROCESSING SYSTEM, AND METHOD FOR INITIALIZING A MEMORY BLOCK IN A DATA PROCESSING SYSTEM HAVING MULTIPLE COHERENCY DOMAINS

CROSS-REFERENCE TO RELATED APPLICATION

The present invention is related to U.S. Pat. Nos. 7,290,094 and 7,389,388, which are incorporated herein by reference in their entireties.

BACKGROUND OF THE INVENTION

1. Technical Field

The present invention relates in general to data processing and, in particular, to initializing memory blocks in a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherency states stored in association with the cache lines of each cache hierarchy, as well as a set of coherency messages utilized to communicate the cache state information between cache hierarchies. In a typical implementation, the coherency state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

The present invention appreciates that it would be useful and desirable to initialize memory blocks within an SMP computer system through the execution of an instruction. The present invention further appreciates that it would be desirable to avoid pollution of the cache hierarchies of the computer system by performing the initialization without requiring that the memory blocks be cached.

SUMMARY OF THE INVENTION

The present invention therefore provides a processor, data processing system, and method of initializing a memory block in a data processing system.

In one embodiment, a data processing system includes at least first and second coherency domains, each including at least one processor core and a memory. In response to an initialization operation by a processor core that indicates a target memory block to be initialized, a cache memory in the first coherency domain determines a coherency state of the target memory block with respect to the cache memory. In response to the determination, the cache memory selects a scope of broadcast of an initialization request identifying the target memory block. A narrower scope including the first coherency domain and excluding the second coherency domain is selected in response to a determination of a first coherency state, and a broader scope including the first coherency domain and the second coherency domain is selected in response to a determination of a second coherency state. The cache memory then broadcasts an initialization request with the selected scope. In response to the initialization request, the target memory block is initialized within a memory of the data processing system to an initialization value.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

I. Exemplary Data Processing System

Figure 1:
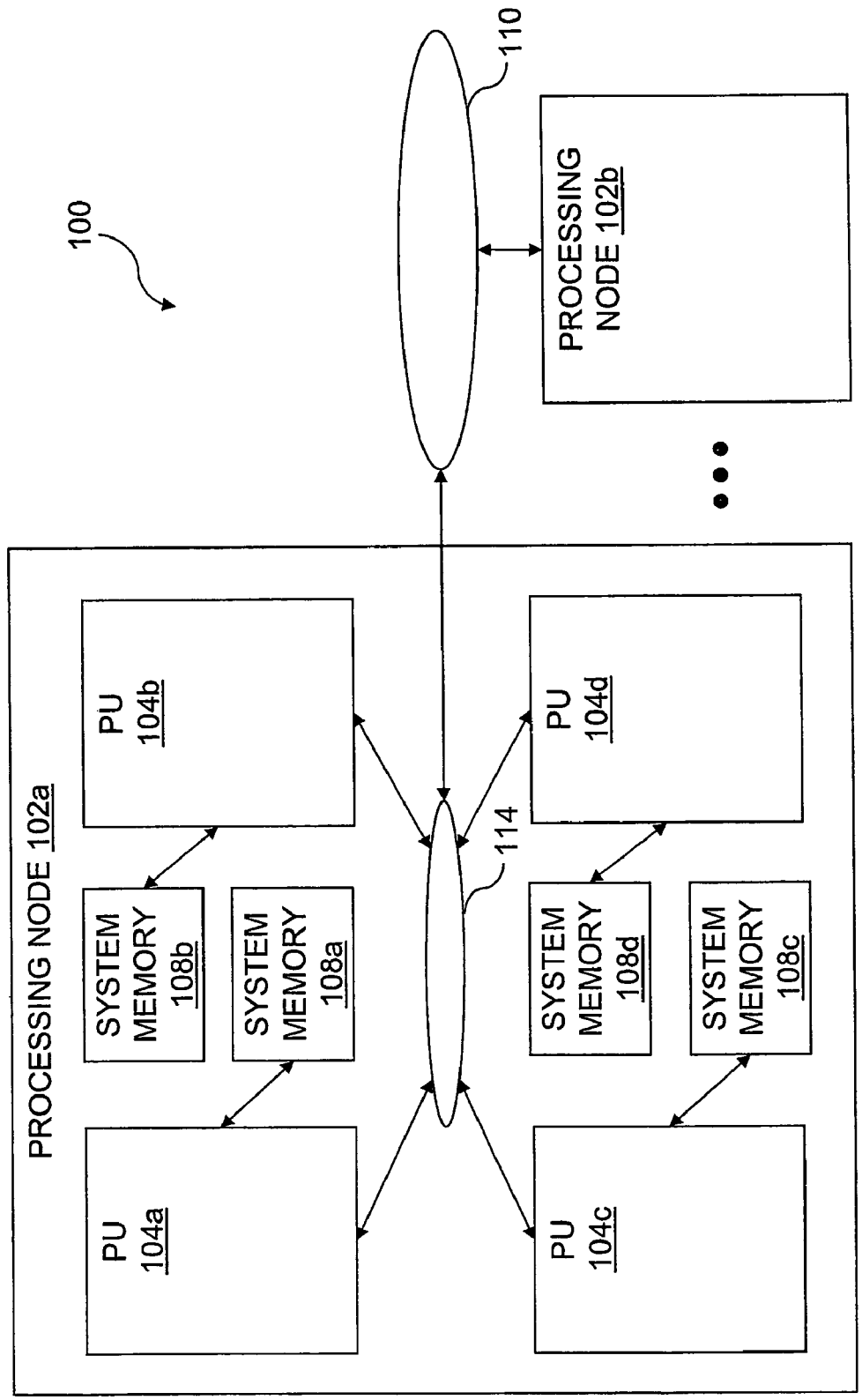
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
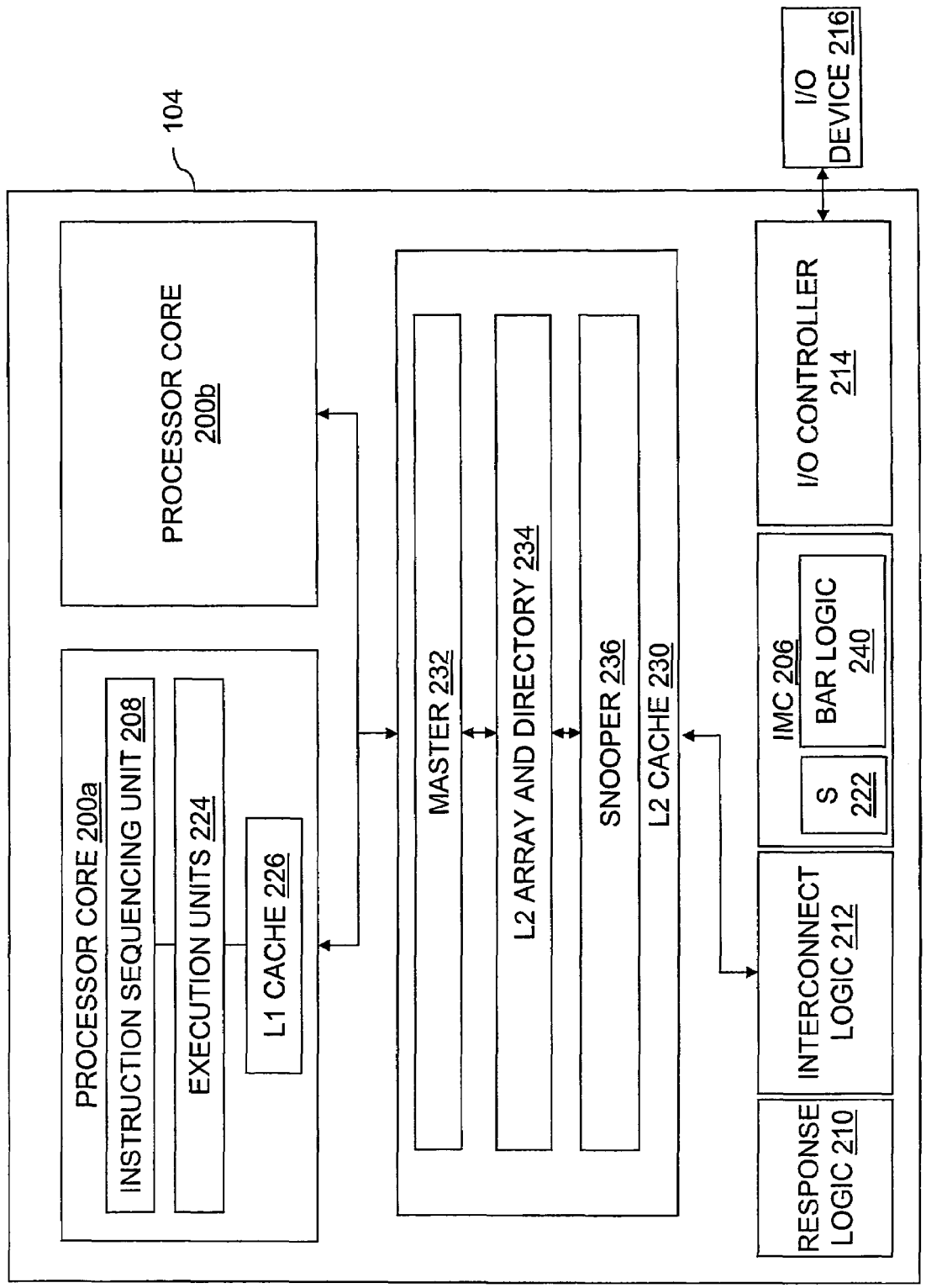
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. As discussed further below, execution units 224 preferably include a load-store unit (LSU) 228 for executing memory access instructions that references a memory block or cause the generation of an operation referencing a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 222 on the local interconnect 114. IMC 206 includes base address register (BAR) logic 240, which includes range registers defining the addresses for which IMC 206 is responsible.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line or lookaside cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
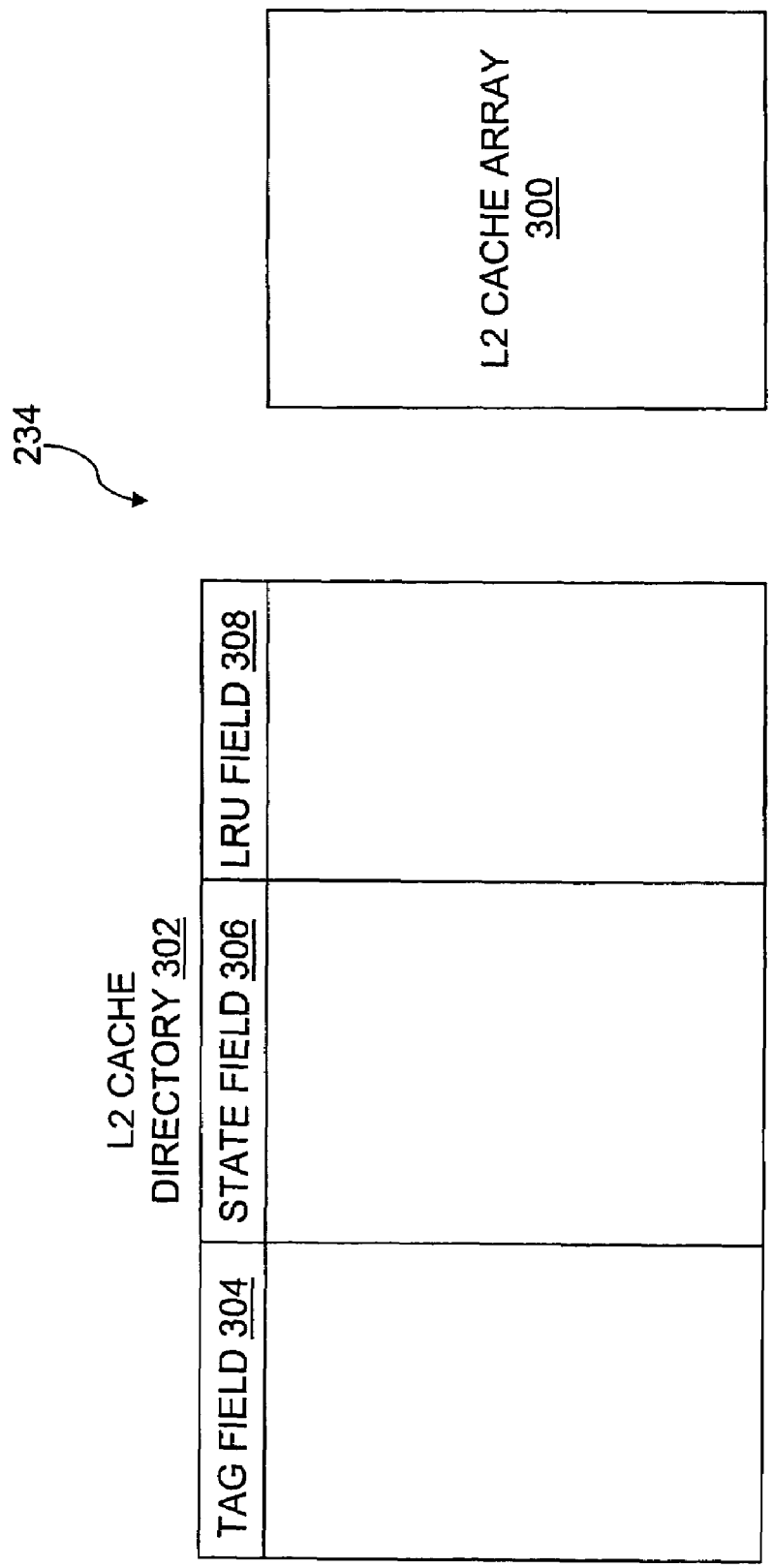
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

II. Exemplary Operation

Figure 4:
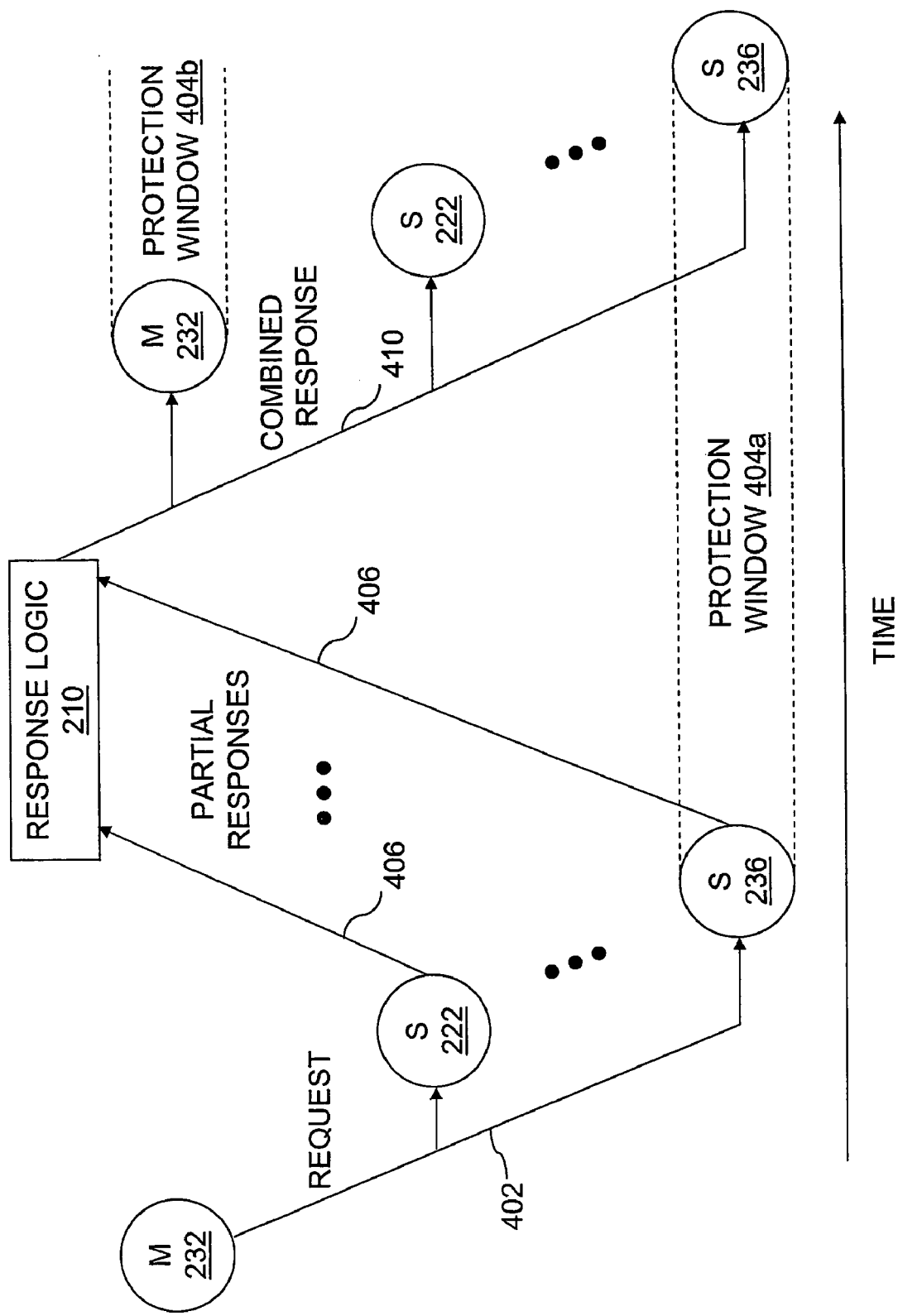
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
|---|---|
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique cached copy of a memory block without regard to its present state and subsequently modify its contents; requires destruction of other copies, if any |
| DCBN (Data Cache Block iNitialize) | Requests authority to initialize a memory block to a predetermined value; invalidates memory block copies, if any, cached other than at the master |
| CASTOUT | Copies the image of a memory block from a higher level of memory to a lower level of memory in preparation for the destruction of the higher level copy |
| KILL | Forces destruction of cached copies, if any, of a memory block not held in the cache hierarchy of the master |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. Each snooper 222, 236 that receives request 402 may provide a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" (e.g., KILL) operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. If required by request 402, a requested or target memory block may be transmitted to or from master 232 before or after the generation of combined response 410 by response logic 210.

In the following description, the partial response of a snooper 222, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that functions as the control point for the repository of a memory block. In the absence of a HPC for the memory block, the LPC controls access to the storage holding the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling a present inability to service the request due to absence of a required resource.

Hereafter, a snooper 222, 236 providing a partial response indicating that the snooper has available all internal resources required to presently service a request, if required, is said to "affirm" the request. For snoopers 236, partial responses affirming a snooped operation preferably indicate the cache state of the requested or target memory block at that snooper 236. A snooper 222, 236 providing a partial response indicating that the snooper 236 does not have available all internal resources required to presently service the request may be said to be "possibly hidden" or "unable" to service the request. Such a snooper 236 is "possibly hidden" or "unable" to service a request because the snooper 236, due to lack of an available instance of snoop logic or present access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, multiple L2 caches 230 distributed throughout data processing system 100 are permitted to hold copies of the same memory block in a "special" shared coherency state that permits these caches to supply the memory block to requesting L2 caches 230 using cache-to-cache intervention. In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master of the operation is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system. Examples of local and global operations are described in detail in U.S. patent application Ser. No. 11/055,305, which is incorporated herein by reference in its entirety.

In a preferred embodiment, the scope of an operation is indicated in a bus operation by a local/global scope indicator (signal), which in one embodiment may comprise a 1-bit flag. Forwarding logic 212 within processing units 104 preferably determines whether or not to forward an operation, received via local interconnect 114 onto system interconnect 110 based upon the setting of the local/global scope indicator (signal) in the operation.

In the present description, a coherency domain is referred to as the "home" coherency domain (or "home" node) of a memory block if the coherency domain (or processing node) contains the LPC of the memory block.

V. Domain Indicators

Figure 5:
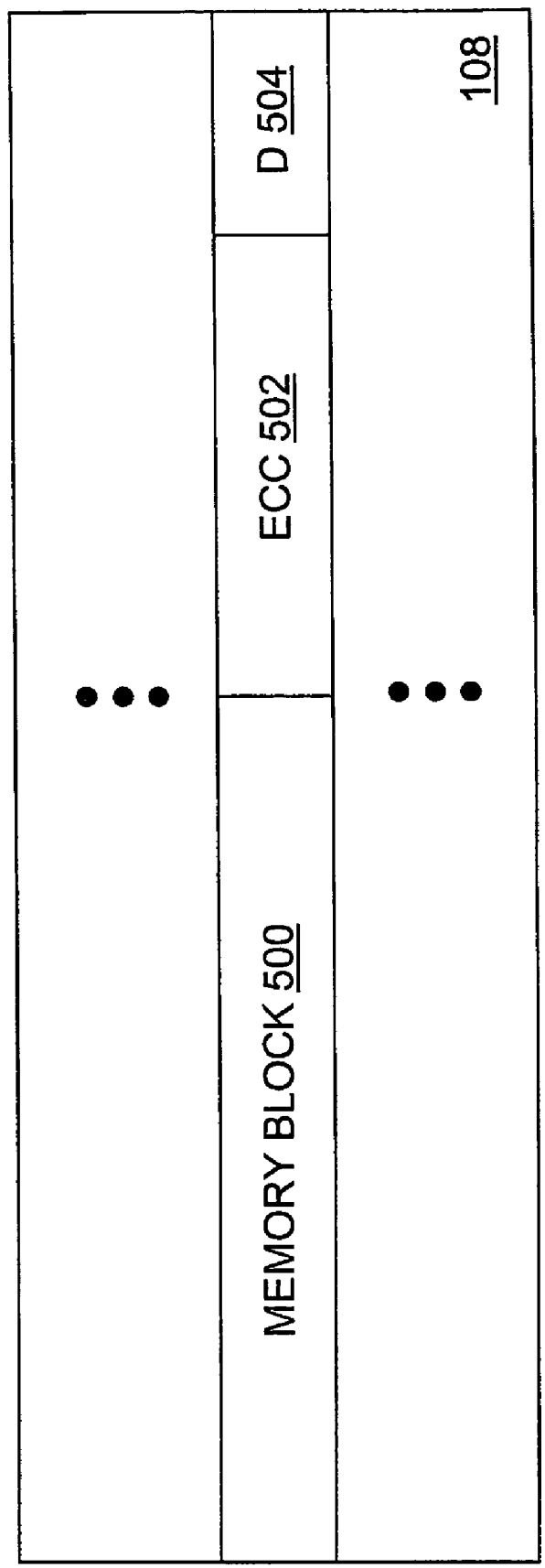
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | Unique? | Data source? | Consistent with LPC? | Cached outside local domain? | Legal concurrent states |
| --- | --- | --- | --- | --- | --- | --- |
| M | yes | yes | yes, before CR | no | no | I, Ig, Igp, In (& LPC) |
| Me | yes | yes | yes, before CR | yes | no | I, Ig, Igp, In (& LPC) |
| T | yes | unknown | yes, after CR if none provided before CR | no | unknown | Sr, S, I, Ig, Igp, In (& LPC) |

TABLE II-continued

| Cache state | HPC? | Unique? | Data source? | Consistent with LPC? | Cached outside local domain? | Legal concurrent states |
|---|---|---|---|---|---|---|
| Tn | yes | unknown | yes, after CR if none provided before CR | no | no | Sr, S, I, Ig, Igp, In (& LPC) |
| Te | yes | unknown | yes, after CR if none provided before CR | yes | unknown | Sr, S, I, Ig, Igp, In (& LPC) |
| Ten | yes | unknown | yes, after CR if none provided before CR | yes | no | Sr, S, I, Ig, Igp, In (& LPC) |
| Sr | no | unknown | yes, before CR | unknown | unknown | T, Tn, Te, Ten, S, I, Ig, Igp, In (& LPC) |
| S | no | unknown | no | unknown | unknown | T, Tn, Te, Ten, Sr, S, I, Ig, Igp, In (& LPC) |
| I | no | n/a | no | n/a | unknown | M, Me, T, Tn, Te, Ten, Sr, S, I, Ig, Igp, In (& LPC) |
| Ig | no | n/a | no | n/a | Assumed so, in absence of other information | M, Me, T, Tn, Te, Ten, Sr, S, I, Ig, Igp, In (& LPC) |
| Igp | no | n/a | no | n/a | Assumed so, in absence of other information | M, Me, T, Tn, Te, Ten, Sr, S, I, Ig, Igp, In (& LPC) |
| In | no | n/a | no | n/a | Assumed not, in absence of other information | M, Me, T, Tn, Te, Ten, Sr, S, I, Ig, Igp, In (& LPC) |

A. Ig State

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in a coherency domain other than the home coherency domain. The Ig indication is preferably imprecise, meaning that it may be incorrect without a violation of coherency.

The Ig state is formed in a lower level cache in the home coherency domain in response to that cache providing a requested memory block to a requester in another coherency domain in response to an exclusive access request (e.g., a bus RWITM operation).

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I, In or Igp entry is selected) in order to update the corresponding domain indicator 504 in system memory 108. Second, if a request that causes a memory block to be loaded into a cache hits on an Ig cache entry in that same cache, the cache treats the Ig hit as a cache miss and performs a castout operation with the Ig entry as the selected victim. The cache thus avoids avoid placing two copies of the same address tag in the cache directory. Third, the castout of the Ig state is preferably performed as a local-only operation limited in scope to the local coherency domain. Fourth, the castout of the Ig state is preferably performed as a dataless address-only operation in which the domain indication is written back to the domain indicator 504 in the LPC.

Implementation of an Ig state in accordance with the present invention improves communication efficiency by maintaining a cached domain indicator for a memory block in a home coherency domain even when no valid copy of the memory block remains cached in the home coherency domain. As described below, the cache domain indication provided by the Ig state can be utilized to predict a global broadcast scope on the interconnect fabric for operations targeting the associated memory block.

B. Igp State

The Igp (Invalid global predict-only) coherency state is utilized to maintain a cached domain indication in cases in which no copy of a memory block remains cached in a non-home coherency domain. The Igp state is defined herein as a cache coherency state indicating (1) the associated memory block in the cache array is invalid, (2) the address tag in the cache directory is valid, (3) the present coherency domain is not the home coherency domain, and (4) a copy of the memory block identified by the address tag may possibly be cached in a coherency domain other than the present non-home coherency domain. Although precisely formed, the Igp indication is preferably imprecisely maintained, meaning that it may be incorrect without a violation of coherency.

The Igp state is formed in a lower level cache in a non-home coherency domain in response to that cache providing coherency ownership of a requested memory block to a requestor in another coherency domain in response to an exclusive access request (e.g., a RWITM, DClaim, DCBZ, Kill, Write or Partial Write request).

Because cache directory entries including an Igp state carry potentially useful information, it is desirable in at least some implementations to preferentially retain entries in the Ig state over entries, if any, in the I state (e.g., by modifying the Least Recently Used (LRU) algorithm utilized to select a victim cache entry for replacement). As Igp directory entries are retained in cache, it is possible for some Igp entries to become "stale" over time in that a copy of the memory block may return to the coherency domain without snooping by the cache holding the address tag of the memory block in the Igp state. In such cases, the "stale" Igp state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Igp cache entries.

In contrast to the handling of Ig entries, no castout of Igp entries is performed in response to selection of an Igp entry as the victim for replacement, for example, in accordance with a replacement algorithm (e.g., LRU) or because a request that causes a memory block to be loaded into a cache hits on an Igp cache entry in that same cache. Instead, the Igp entry is simply deallocated. No castout is performed because Igp entries do not maintain a cached and possibly modified copy of the underlying domain indicators 504.

Implementation of an Igp state in accordance with the present invention improves communication efficiency by maintaining a cached domain indicator for a memory block in a non-home coherency domain for scope prediction purposes even when no valid copy of the memory block remains cached in the non-home coherency domain.

C. In State

The In state is defined herein as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. The In indication is preferably imprecise, meaning that it may be incorrect without a violation of coherency. The In state is formed in a lower level cache in response to that cache providing a requested memory block to a requester in the same coherency domain in response to an exclusive access request (e.g., a bus RWITM operation).

Because cache directory entries including an In state carry potentially useful information, it is desirable in at least some implementations to preferentially retain entries in the In state over entries in the I state (e.g., by modifying the Least Recently Used (LRU) algorithm utilized to select a victim cache entry for replacement). As In directory entries are retained in cache, it is possible for some In entries to become "stale" over time in that a cache whose exclusive access request caused the formation of the In state may itself supply a shared copy of the memory block to a remote coherency domain without notification to the cache holding the address tag of the memory block in the In state. In such cases, the "stale" In state, which incorrectly indicates that a local operation should be issued instead of a global operation, will not cause any coherency errors, but will merely cause some operations to be erroneously first issued as local operations, rather than as global operations. Occurrences of such inefficiencies will be limited in duration by the eventual replacement of the "stale" In cache entries. In a preferred embodiment, cache entries in the In coherency state are not subject to castout, but are instead simply replaced. Thus, unlike Ig cache entries, In cache entries are not utilized to update domain indicators 504 in system memories 108.

Implementation of an In state in accordance with the present invention improves communication efficiency by maintaining a cached domain indicator for a memory block that may be consulted by a master in order to select a local scope for one of its operations. As a consequence, bandwidth on system interconnect 110 and local interconnects 114 in other coherency domains is conserved.

D. Sr State

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a range indicator indicating whether the bus operation has crossed a domain boundary (e.g., an explicit domain identifier of the master or a single local/not local range bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
| --- | --- | --- | --- |
| "local" (i.e., within same domain) | Sr | Sr' affirm | Sr' possibly hidden |
| "remote" (i.e., not within same domain) | Sr | S' affirm | S' possibly hidden |
| "local" (i.e., within same domain) | S | S' affirm | S' possibly hidden |
| "remote" (i.e., not within same domain) | S | S' affirm | S' possibly hidden |

Assuming the response behavior set forth above in Table III, the average data latency for shared data can be significantly decreased by increasing the number of shared copies of memory blocks distributed within an SMP data processing system that may serve as data sources.

VII. Exemplary Memory Initialization Operation

Figure 6:
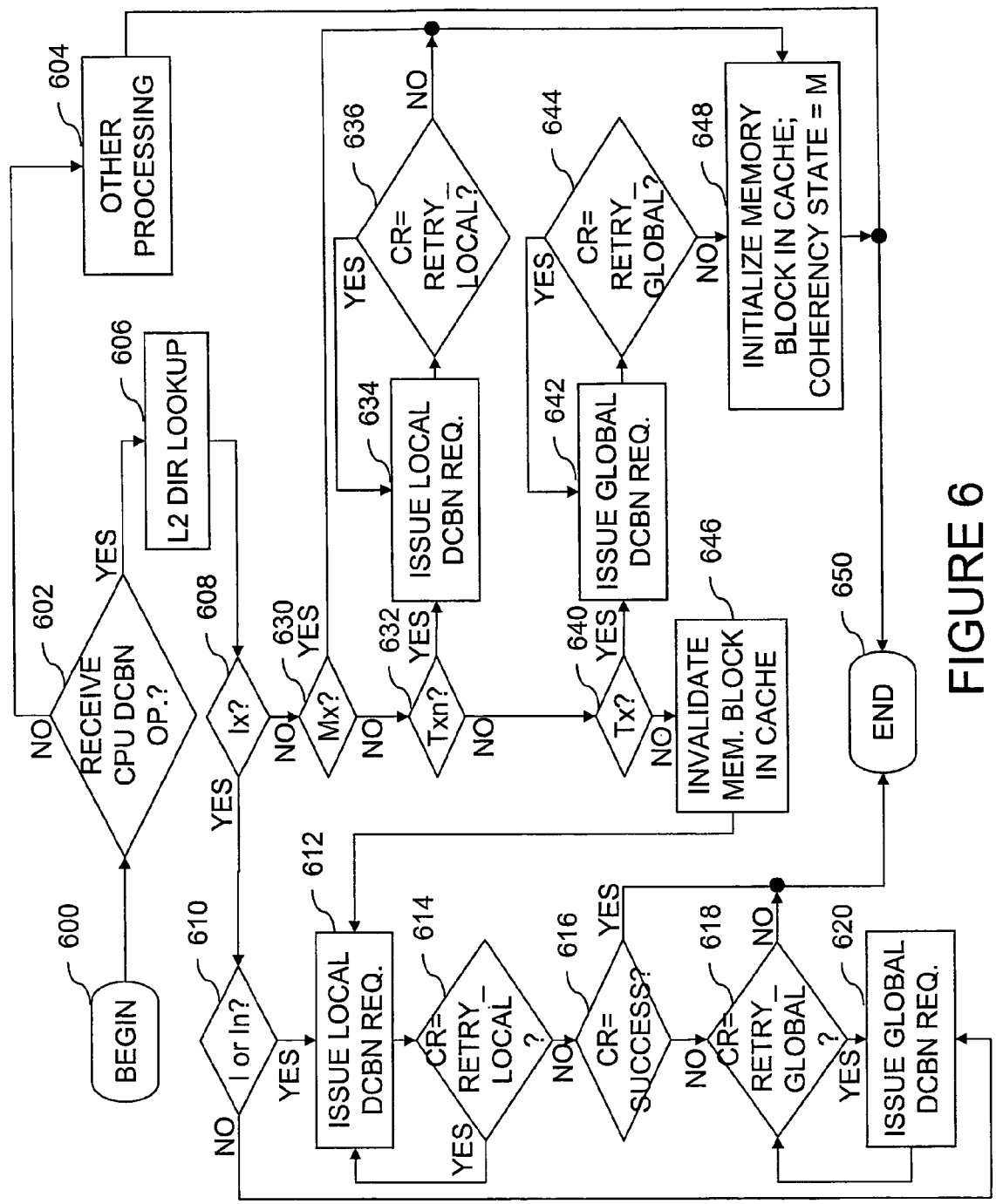
FIG. 6 is a high level logical flowchart of an exemplary embodiment of a method by which a cache memory services a memory initialization operation of an associated processor core in accordance with the present invention.

Referring now specifically to FIG. 6, there is depicted a high level logical flowchart of an exemplary embodiment of a method by which a cache memory services a memory initialization operation received from an associated processor core in accordance with the present invention. The illustrated process begins at block 600 in response to receipt by a master 232 of an L2 cache 230 of a CPU operation from one of the associated processor cores 200 within its processing unit 104. The process then proceeds to block 602, which depicts the master 232 determining whether or not the operation is a CPU DCBN (Data Cache Block iNitialize) operation, received, for example, in response to execution of a corresponding DCBN instruction by the source processor core 200.

Figure 10:
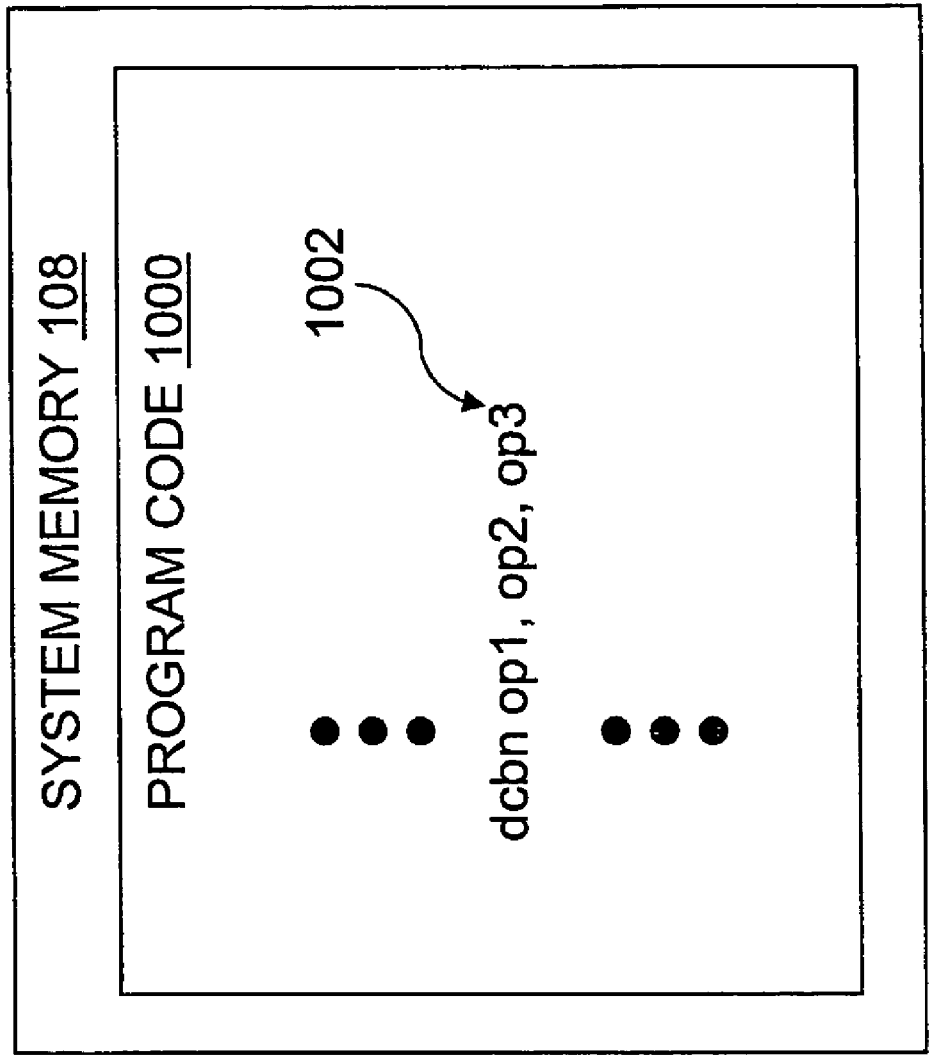
FIG. 10 is a block diagram of program code in accordance with the present invention.

FIG. 10 illustrates an exemplary DCBN instruction 1002 forming a portion of computer usable program code 1000 stored at least partially within a system memory 108 and subject to execution or processing by processor cores 200. The exemplary DCBN instruction preferably includes an operation code (represented in FIG. 10 by the mnemonic "dcbn") identifying the instruction as a DCBN instruction and an indication of a target real address of a target memory block to be initialized. The target real address is preferably indicated in a conventional manner by one or more of the instruction input operands op1, op2 and op3. The input operands may optionally indicate additional information, for example, an indication of an address range of target memory blocks to be initialized and/or an indication of an initialization value to which the target memory blocks are to be initialized (e.g., all 0s, all 1s, or a register-specified value). If no initialization value is explicitly indicated, the operation code of the DCBN instruction may imply a default value (e.g., all 0s or all 1s).

In a preferred embodiment, the CPU DCBN operation sent by a processor core 200 to a master 232 in response to the execution of a DCBN instruction similarly includes at least an operation code identifying the memory access operation as a CPU DCBN operation and an indication of a target real address of a target memory block to be initialized. The CPU DCBN operation may optionally indicate additional information, for example, an indication of an address range of target memory blocks to be initialized and/or an indication of an initialization value to which the target memory blocks are to be initialized (e.g., all 0s, all 1s, or a register-specified value). If no initialization value is explicitly indicated, the operation code of the CPU DCBN operation may imply a default value (e.g., all 0s or all 1s).

In response to a determination at block 602 that the CPU operation received by the master 232 is not a CPU DCBN operation, the process proceeds to block 604, which represents master 232 performing other processing in accordance with the operation type of the received CPU operation. The process then terminates at block 650.

Returning to block 602, in response to a determination that the received operation is a CPU DCBN operation, master 232 initiates a lookup of L2 cache directory 302 at block 606 to determine the coherency state, if any, recorded within L2 cache directory 302 for the target address specified by the CPU DCBN operation. If L2 cache directory 302 indicates at block 608 that the target address is not associated with any data-valid coherency state (e.g., M, Me, T, Tn, Te, Ten, Sr, or S) but is instead associated with a data-invalid coherency state (e.g., I, Ig, Igp or In), then the process proceeds to block 610, which depicts master 232 determining whether to issue a DCBN of global or local scope based upon the data-invalid coherency state read from its L2 cache directory 302. That is, if the coherency state for the target address is Ig or Igp, indicating that the HPC for the target address is likely to reside in a different coherency domain (e.g., processing node 104), master 232 issues a DCBN request of global scope on its local interconnect 114 and system interconnect 110, as depicted at block 620. If, on the other hand, the coherency state is In or I, indicating that the HPC for the target address may reside in the local coherency domain of master 232, master 232 issues a DCBN request of local scope on its local interconnect 114 as shown at block 612. Although interconnects 114, 110 are not necessarily bused interconnects, such requests are designated herein as bus DCBN requests to differentiate them from processor-executed DCBN instructions and the CPU DCBN operations received by masters 232 from processor cores 200.

In a preferred embodiment, the bus DCBN request issued by master 232 includes at least a request vector identifying the request as a bus DCBN request and an indication of the target real address of the target memory block. Like the CPU DCBN operation described above, the bus DCBN request may optionally indicate additional information, for example, an indication of an address range of target memory blocks to be initialized and/or an indication of an initialization value to which the target memory blocks are to be initialized (e.g., all 0s, all 1s, or a specified value). If no initialization value is explicitly indicated, the request vector of the bus DCBN request may imply a default value (e.g., all 0s or all 1s).

Following the issuance of a local bus DCBN request at block 612, master 232 awaits the combined response (CR) of the local bus DCBN request. As depicted at blocks 614, 616 and 618, the CR of a local bus DCBN request can be of any of three types: (1) Retry_local, (2) Success, or (3) Retry_global. If the combined response (CR) indicates Retry_local (block 614), then master 232 again issues a local bus DCBN request, as indicated by the process returning from block 614 to block 612. If the CR does not indicate Retry_local, but instead indicates Success (e.g., Success_HPC or Success_No_HPC) (block 616), then the initialization of the target memory block was successful, and the process ends at block 650. It should be noted that when the requesting L2 cache 230 does not hold a copy of the target memory block of a CPU DCBN operation, the requesting L2 cache 230 is not required to "pollute" its L2 cache array 300 by loading a copy of the target memory block in order to service the CPU DCBN operation. Instead, the requesting L2 cache 230 services the CPU DCBN operation by simply issuing one or more corresponding bus DCBN requests until a Success combined response is received.

Referring to block 618, if master 232 determines that the CR of the local bus DCBN request indicates Retry_global, master 232 reissues the bus DCBN request with a global scope, as depicted by the process passing to block 620. In accordance with one embodiment of the present invention, the CR for a global bus DCBN request may indicate either Retry_global or Success. If the CR of a global bus DCBN request indicates Retry_global, the process returns to block 620, and master 232 reissues a global bus DCBN request. If, on the other hand, the CR of a global bus DCBN request indicates Success (e.g., Success_HPC or Success_No_HPC), the process proceeds from block 618 to block 650 and terminates.

Returning to block 608, in response to master 232 determining that the target address hit in L2 cache directory 302 in a data-valid coherency state, the process passes to block 630 and following blocks, and master 232 services the CPU DCBN operation in accordance with the coherency state of the target memory block. If master 232 determines at block 630 the coherency state of the target memory block is Mx (e.g., M or Me), master 232 simply initializes the target memory block by writing the target memory block with the appropriate initialization value, as shown at block 648. If not already set to M, the coherency state of the target memory block is updated to M to indicate that the target memory block is now inconsistent with the corresponding memory block in system memory 108. Thereafter, the process ends at block 650.

Referring now to block 632, if master 232 determines that the coherency state of the target memory block in its L2 cache directory 302 is Txn (e.g., Tn or Ten), master 232 issues a bus DCBN request of local scope on its local interconnect 114, as shown at block 634. Following block 634, master 232 awaits the combined response of its local bus DCBN request. In response to receipt of the CR, master 232 determines at block 636 if the CR indicates Retry_local. If so, master 232 reissues the local bus DCBN request, as indicated by the process returning from block 636 to block 634. Reissuing the local bus DCBN request in this manner ensures that each other L2 cache 230 in the local coherency domain that holds a copy of the target memory block commits to update its respective copy of the target memory block to a data-invalid state prior to the initialization of the target memory block by the requesting L2 cache 230. If, on the other hand, master 232 determines at block 636 that the combined response does not indicate Retry_local, but instead indicates Success, master 232 initializes the target memory block by writing the target memory block with the appropriate initialization value, as shown at block 648. Master 232 also updates the coherency state of the target cache line in its L2 cache directory 302 to M (although this update is not required to maintain coherency for a target memory block in the Tn or Ten coherency state and may therefore be omitted for such memory blocks). Thereafter, the process ends at block 650.

Referring again to block 632 and additionally to block 640, if master 232 determines that the coherency state of the target memory block in its L2 cache directory 302 is not Txn but is instead Tx (e.g., T or Te), master 232 issues a bus DCBN request of global scope on its local interconnect 114 and system interconnect 110, as shown at block 642. Following block 642, master 232 awaits the combined response of its global DCBN request. In response to receipt of the CR, master 232 determines at block 644 if the CR indicates Retry_global. If so, master 232 reissues the global bus DCBN request, as indicated by the process returning from block 644 to block 642. Reissuing the global bus DCBN request in this manner ensures that each other L2 cache 230 that holds a copy of the target memory block commits to update its respective copy of the target memory block to a data-invalid state prior to the initialization of the target memory block by the requesting L2 cache 230. If, on the other hand, master 232 determines at block 644 that the combined response does not indicate Retry_global, but instead indicates Success, master 232 initializes the target memory block by writing the target memory block with the appropriate initialization value, as shown at block 648. Master 232 also updates the coherency state of the target cache line in its L2 cache directory 302 to M (although this update is not required to maintain coherency for a target memory block in the T or Te coherency state and may therefore be omitted for such memory blocks). Thereafter, the process ends at block 650.

Referring again to block 640, if master 232 determines that the coherency state of the target memory block is not Mx or Tx (e.g., the coherency state is S or Sr), master 232 updates the coherency state of the target cache block within its L2 cache directory 302 to the I coherency state, as illustrated at block 646. Thereafter, the process passes to block 612 and following blocks, which have been described. Thus, if the requesting L2 cache 230 holds the target memory block in a non-HPC data-valid coherency state, the requesting L2 cache 230 preferably does not expend its resources and interconnect bandwidth obtaining permission to modify its copy of the target memory block in order to service the CPU DCBN operation. Instead, the requesting L2 cache 230 preferably services the CPU DCBN operation by simply invalidating its copy of the target memory block and issuing one or more corresponding bus DCBN requests until a combined response other than Retry is received.

Figure 7:
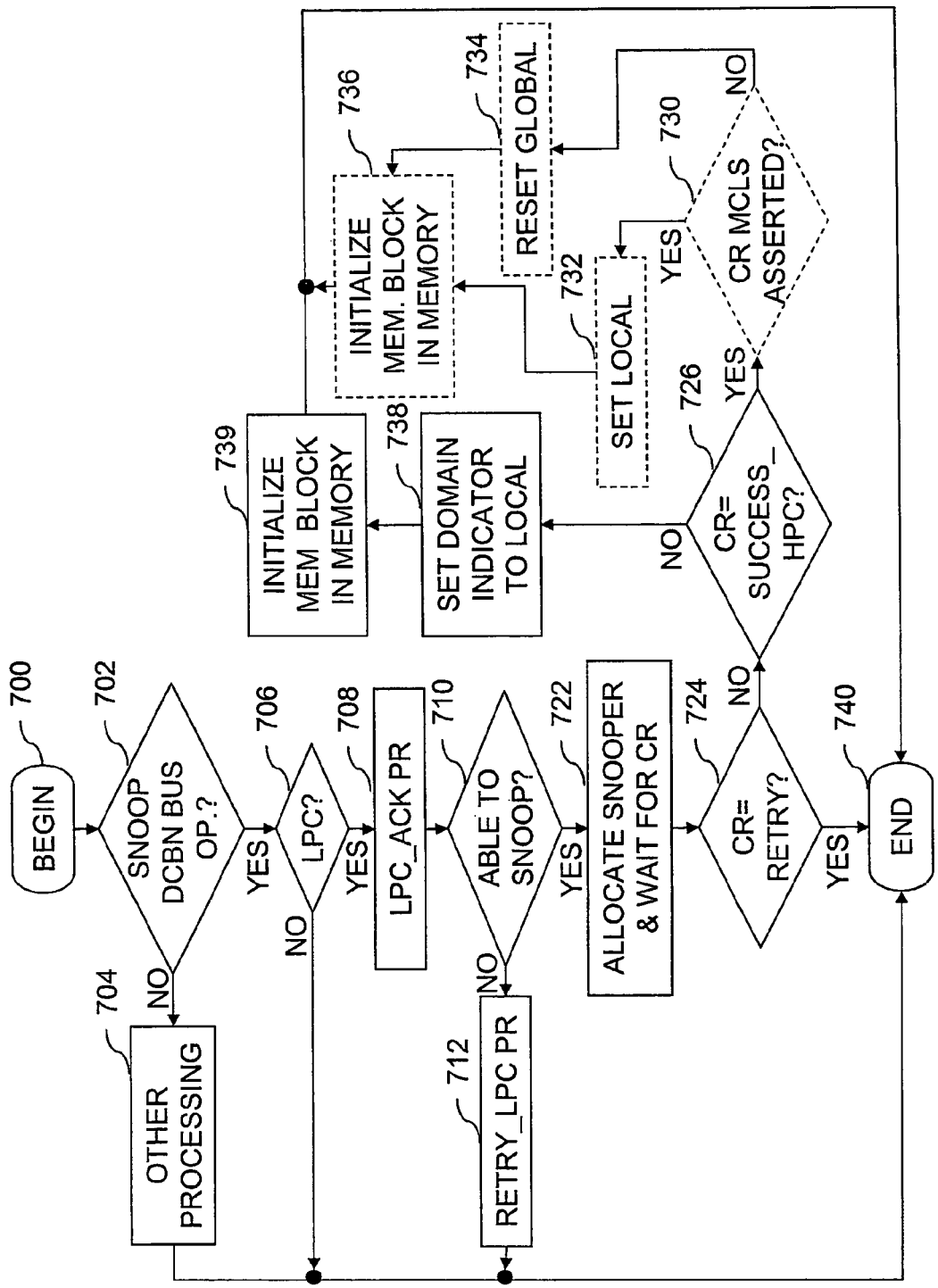
FIG. 7 is a high level logical flowchart of an exemplary embodiment of a method of servicing a memory initialization request by a snooping memory controller in accordance with the present invention.

With reference now to FIG. 7, there is illustrated a high level logical flowchart of an exemplary embodiment of a method by which a memory controller, such as an integrated memory controller 206, services a memory initialization request in accordance with the present invention. The illustrated process begins at block 700 in response to receipt by an IMC 206 of a memory access request. The process then proceeds to block 702, which depicts IMC 206 determining whether or not the memory access request is a bus DCBN request. If so, the process proceeds to block 706, which is described below. If not, the process passes to block 704, which depicts IMC 206 processing the request in accordance with its request type. The process thereafter terminates at block 740.

Referring now to block 706, if the received request is a bus DCBN request, IMC 206 determines whether or not it is the LPC for the target address specified by the bus DCBN request by reference to BAR logic 240. If IMC 206 determines that it is not the LPC for the target address of the bus DCBN request, the process simply terminates at block 740. If, however, IMC 206 determines that it is the LPC for the target address of the bus DCBN request, the process proceeds to block 708, which depicts IMC 206 providing an LPC_ack partial response. IMC 206 also determines at block 710 whether it has sufficient resources available to service the bus DCBN request. If not, snooper 222 provides an additional Retry_LPC partial response, as shown at block 712. Thereafter, processing terminates at block 740. If, however, IMC 206 determines at block 710 that it has sufficient available resources to service the bus DCBN request, IMC 206 allocates a snooper 222 to await receipt of the CR for the bus DCBN request (block 722). If the CR indicates Retry (e.g., Retry_global or Retry_local), IMC 206 deallocates the snooper 222 allocated to the bus DCBN request, and the process terminates at block 740.

If the snooper 222 allocated to the bus DCBN request determines at block 724 that the CR does not indicate Retry, the bus DCBN request succeeded, and the process passes to block 726. Block 726 depicts snooper 222 optionally determining whether or not the CR for the bus DCBN request indicates Success_HPC, meaning that an HPC for the target memory block has a cached copy of the target memory block. If so, the process may proceed directly to block 740 and terminate. Optionally, in some embodiments, snooper 222 may update the domain indicator 504 of the target memory block and initialize the target memory block in system memory 108. In such embodiments, snooper 222 determines at block 730 whether or not it is within the same coherency domain as the HPC for the target memory block, for example, by determining if the Memory Controller Local to Snooper (MCLS) signal is asserted within the CR for the bus DCBN operation. If not, snooper 222 resets the domain indicator 504 of the target memory block to indicate Global at block 734 and otherwise sets the domain indicator 504 to indicate Local at block 732. Snooper 222 may also optionally initialize the target memory block in the associated system memory 108, as shown at block 736. This initialization is optional because the HPC will initialize the memory block within its L2 cache array 300, as discussed further below at block 816 and block 827 of FIG. 8. Following block 736, snooper 222 is deallocated, and the process terminates at block 740.

Returning to block 726, in response to a negative determination, meaning that the CR is Success_No_HPC rather than Success_HPC, the process passes to block 738, which depicts snooper 222 setting the domain indicator 504 for the target memory block to indicate Local. In addition, snooper 222 initializes the target memory block in system memory 108 to the appropriate initialization value (block 739). Snooper 222 is then deallocated, and the process then terminates at block 740.

Figure 8:
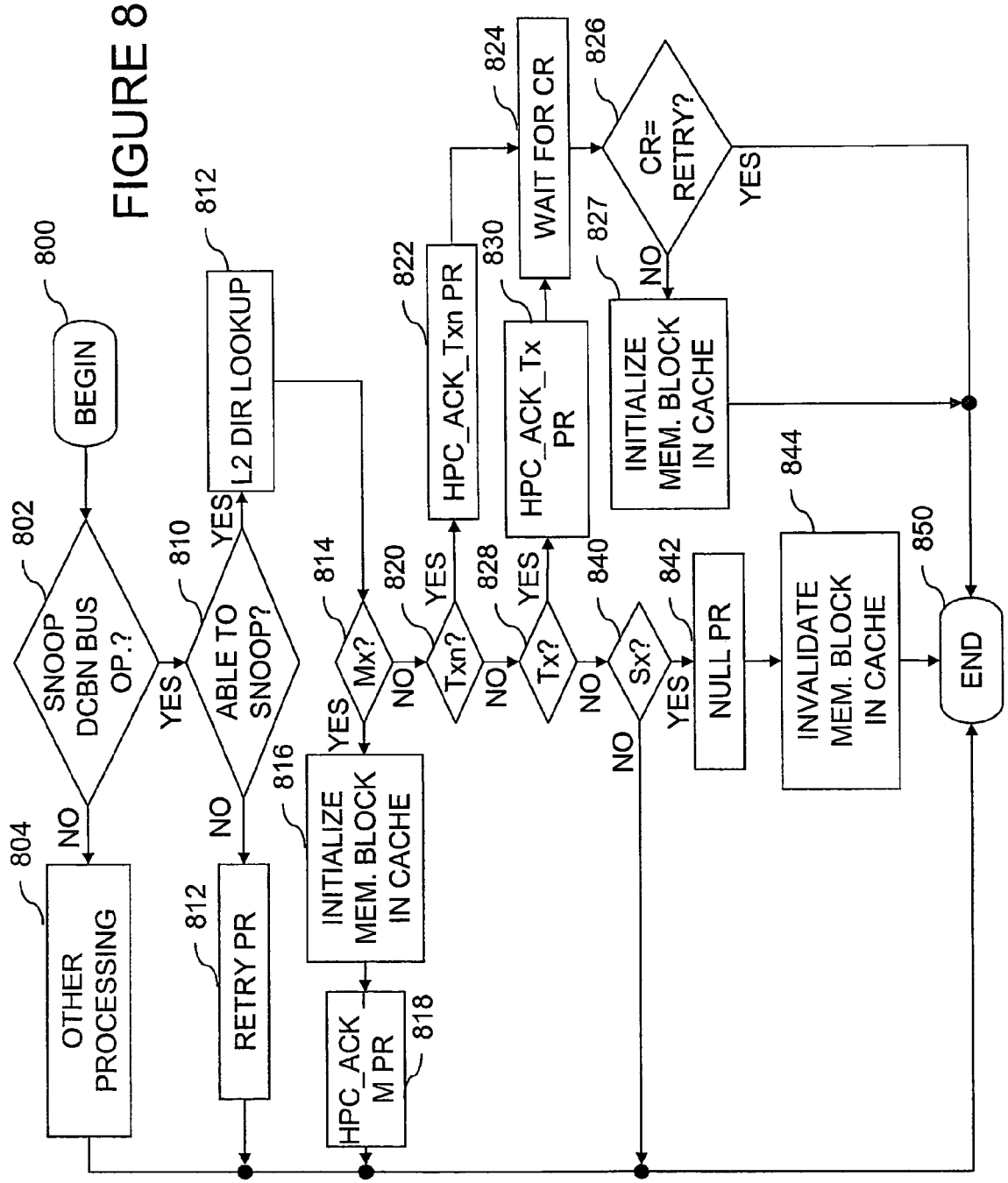
FIG. 8 is a high level logical flowchart of an exemplary embodiment of a method of servicing a memory initialization request by a snooping cache memory in accordance with the present invention.

Referring now to FIG. 8, there is depicted a high level logical flowchart of an exemplary embodiment of a method by which a cache memory services a memory initialization request snooped on an interconnect in accordance with the present invention. The illustrated process begins at block 800 in response to receipt by a snooper 236 of an L2 cache 230 of a request on its local interconnect 114. The process then proceeds to block 802, which depicts the snooper 236 determining whether or not the received operation is a bus DCBN request. If not, the process proceeds to block 804, which represents snooper 236 performing other processing in accordance with the request type of the received request. The process then terminates at block 850.

Returning to block 802, in response to a determination that the received operation is a bus DCBN request, snooper 236 determines at block 810 whether it has sufficient resources available to service the bus DCBN request. If not, snooper 236 provides a partial response indicating Retry, as shown at block 812. Thereafter, processing terminates at block 850. If, however, snooper 236 determines at block 810 that it has sufficient available resources to service the bus DCBN request, snooper 236 initiates a lookup of its L2 cache directory 302 at block 812 to determine the coherency state, if any, recorded for the target address specified by the bus DCBN request. If the L2 cache directory 302 indicates that the target address is associated with an Mx coherency state (e.g., M or Me) as shown at block 814, snooper 236 initializes the target memory block to the appropriate initialization value in its L2 cache array 230, as shown at block 816, and provides a HPC_Ack_M partial response, as illustrated at block 818. Thereafter, processing ends at block 850.

If the coherency state of the target memory block is not Mx, the process proceeds from block 814 to blocks 820 and 828, which illustrates snooper 236 determining if the coherency state for the target address in its L2 cache directory 302 is Txn (e.g., Tn or Ten) or Tx (e.g., T or Te). If so, snooper 236 provides an HPC_Ack_Txn partial response (block 822) or HPC_Ack_Tx partial response (block 830). Thereafter, snooper 236 awaits receipt of the CR of the bus DCBN request at block 824. As indicated at block 826, if the combined response does not indicate Retry, meaning that each other cached copy of the target memory block, if any, has been invalidated, snooper 236 initializes the target memory block to the appropriate initialization value, as depicted at block 827. Thereafter, the process terminates at block 850. However, if snooper 236 receives a combined response that indicates Retry (e.g., Retry_local or Retry_global) at block 826, snooper 236 does not initialize the target memory block, and processing ends at block 850 until the bus DCBN request is reissued.

Referring now to block 840, if snooper 236 determines that the target memory block is not associated with a Txn or Tx coherency state in its L2 cache directory 302, snooper 236 determines if the coherency state of the target memory block is Sx (e.g., S or Sr). If not, the process terminates at block 850. If, however, the target memory block is associated with an Sx coherency state in L2 cache directory 302, snooper 236 invalidates the Sx copy of the target memory block by updating its coherency state to I in the L2 cache directory 302 (block 844). Thereafter, the process ends at block 850.

Figure 9A:
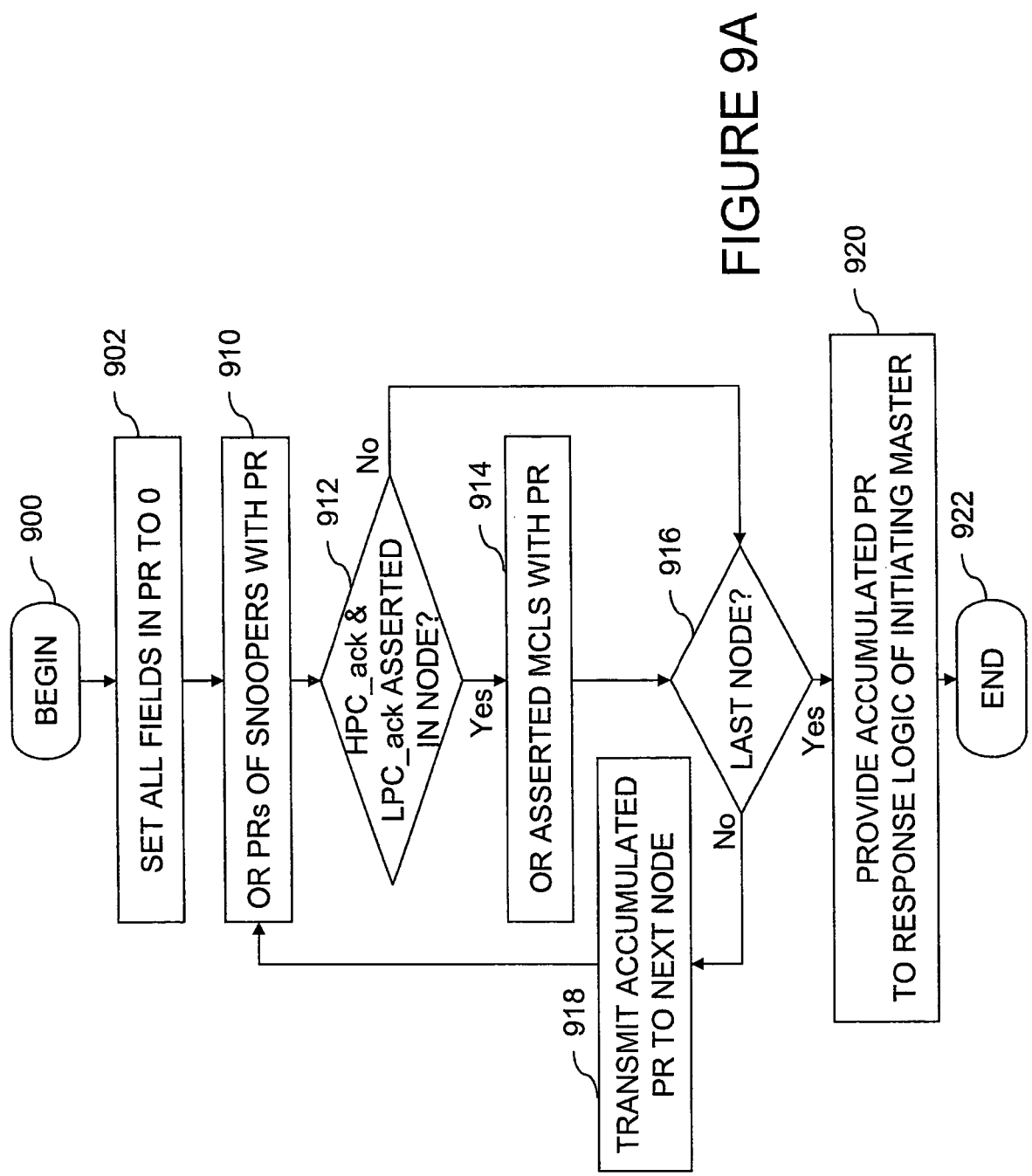
FIG. 9A is a high level logical flowchart of an exemplary process by which partial responses are accumulated in stages in accordance with one embodiment of the present invention.

Referring now to FIG. 9A, there is depicted a high level logical flowchart of an exemplary method by which partial responses of an exclusive access operation are generated and accumulated in accordance with the present invention. In the depicted embodiment, partial responses are accumulated node-by-node sequentially or in parallel until a single complete partial response is obtained.

As indicated, the process begins at block 900 and then proceeds to block 902, which illustrates a processing unit 104 within a first processing node 102 initializing all bit fields within the partial response to 0. Next, at block 910 each snooper 222, 236 in the processing node 104 performs a logical OR of its individual partial response with the accumulated partial response. Response logic 210 within the processing node 102 then determines at block 912 whether an HPC_ack partial response and an LPC_ack partial response were asserted by an L2 cache snooper 236 and a memory controller snooper 222, respectively, within the current processing node 102. If so, the former HPC of the target memory block and the home system memory 108 of the target memory block are both present in this processing node 102. Accordingly, response logic 210 performs a logical OR operation of an asserted MCLS bit with a corresponding MCLS bit within the accumulated partial response, as depicted at block 914.

Next, at block 916, response logic 210 of the current processing node 102 determines whether or not the current processing node 102 is the last processing node 102 for which the partial response is to be accumulated (e.g., the processing node 102 containing the master 232 that initiated the exclusive access request). If not, response logic 210 transmits the accumulated partial response to a next processing node 102 for processing, as depicted at block 918. Thereafter, the partial response is accumulated in that next processing node 102, as depicted at block 910 and following blocks. If, on the other hand, response logic 210 determines that the present processing node 102 is the last processing node 102 for which partial responses are to be accumulated, the process passes to block 920, which depicts providing the accumulated partial response to the response logic 210 of the processing unit 104 containing the master 232 that initiated the exclusive access operation. Thereafter, the process depicted in FIG. 9A terminates at block 922.

Figure 9B:
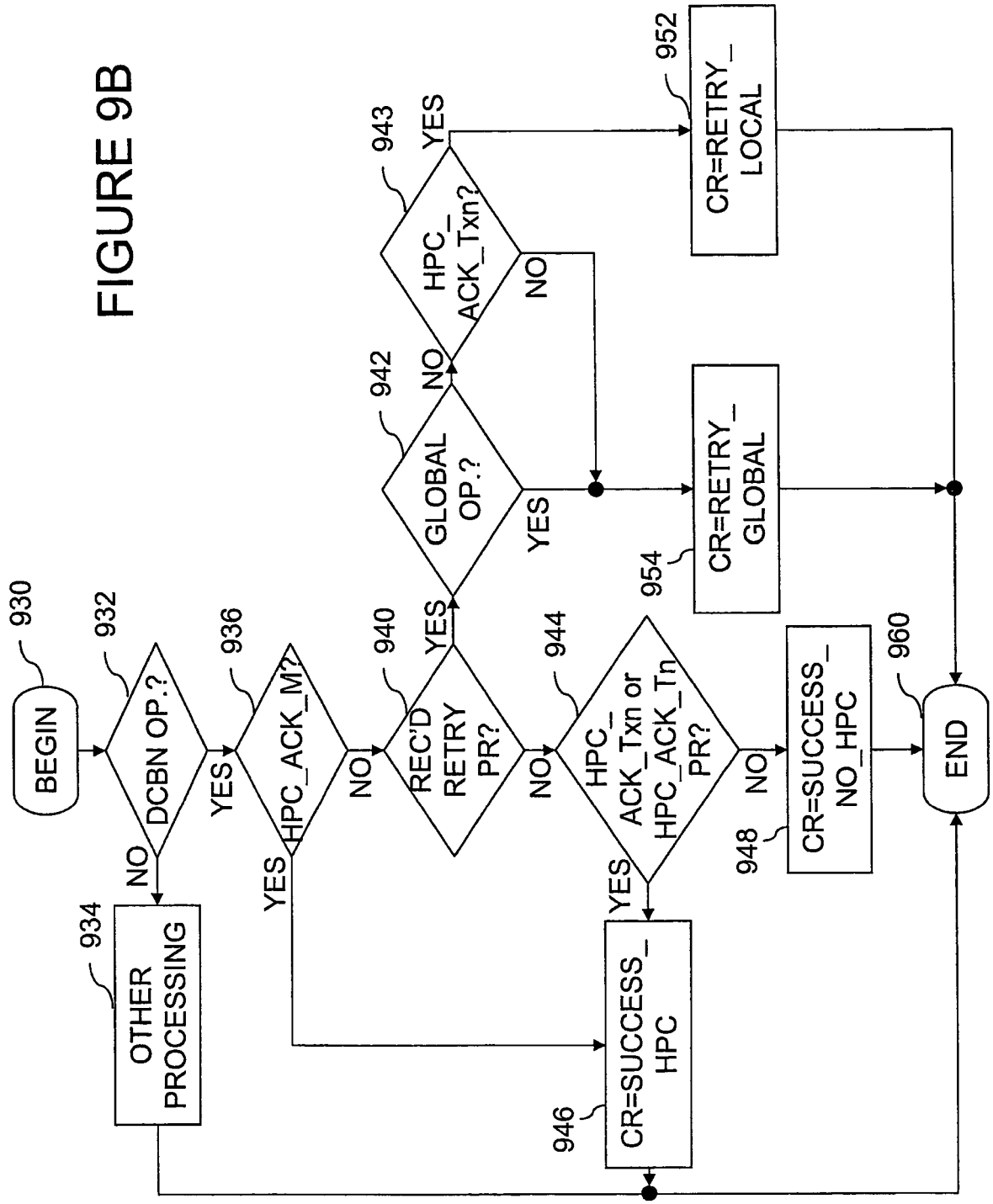
FIG. 9B is a high level logical flowchart of an exemplary embodiment of a method of generating a combined response for a memory initialization request in accordance with the present invention.

With reference now to FIG. 9B, there is illustrated a high level logical flowchart of an exemplary method by which response logic 210 generates a combined response for a bus DCBN request in accordance with a preferred embodiment of the present invention. As depicted, the process begins at block 930 and then proceeds to block 932, which depicts response logic 210 (e.g., the response logic 210 of the processing unit 104 containing the master 232 that initiated the request) determining whether or not the operation is a bus DCBN operation. If not, response logic 210 performs other processing at block 934. Thereafter, the process ends at block 960. If, however, the operation is a bus DCBN operation, response logic 210 also determines at block 936 whether or not the accumulated partial response includes an indication that an HPC_Ack_M partial response was generated by one of snooper 236. If so, the process passes to block 946, which depicts response logic 210 generating and transmitting a CR indicating Success_HPC with a scope matching that of the bus DCBN request. Thereafter, the process ends at block 960. If, however, response logic 210 determines at block 936 that a partial response of HPC_Ack_M was not received, the process passes to block 940.

Block 940 depicts response logic 210 determining whether or not it received a partial response indicating Retry from a L2 cache snooper 236 or IMC 206. If not, the process passes to block 944, which is described below. If so, response logic 210 also determines at block 942 whether or not the operation is a global bus DCBN operation. If so, response logic 210 generates and transmits (with global scope) a CR indicating Retry_global at block 954. Thereafter, the process ends at block 960. If response logic 210 determines at block 942 that the operation is a global bus DCBN operation, response logic 210 determines at block 943 whether or not the accumulated partial response indicates that an L2 cache snooper 236 provided a HPC_Ack_Txn partial response. If so, response logic 210 generates a Retry_local partial response, as depicted at block 952, and otherwise generates a Retry_global partial response, as depicted at block 954. Following either of blocks 952 or 954, the process ends at block 960.

Referring now to block 944, response logic 210 determines whether the accumulated partial response includes an indication that an L2 cache snooper 236 provided an HPC_Ack_Txn or HPC_Ack_Tn partial response. If so, the process passes to block 946, which has been described. If not, response logic 210 generates and transmits with a scope matching the bus DCBN request a CR indicating Success_No_HPC (block 948). Thereafter the process terminates at block 960.

As has been described, the present invention provides a processing unit, data processing system and method of initializing a target memory block. Advantageously, the present invention permits the memory block to be initialized without requiring the requesting cache memory to hold a valid copy of the target memory block before or after the initialization. Furthermore, in selected operating scenarios, the target memory block may be initialized without updating the copy of the target memory block held in system memory.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a computer system executing program code that directs the functions of the present invention, it should be understood that present invention may alternatively be implemented as a program product for use with a data processing system. Program code defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of data processing in a data processing system including at least first and second coherency domains, wherein each of said first and second coherency domains includes at least one processor core and a memory, said method comprising:

in response to an initialization operation by a processor core, said initialization operation indicating a target memory block to be initialized, a cache memory in said first coherency domain determining a coherency state of said target memory block with respect to said cache memory;

in response to said determination, said cache memory selecting a scope of broadcast of an initialization request identifying the target memory block, wherein said selecting includes:

selecting a narrower scope including said first coherency domain and excluding said second coherency domain in response to a determination of a first coherency state; and selecting a broader scope including said first coherency domain and said second coherency domain in response to a determination of a second coherency state;

said cache memory broadcasting an initialization request with said selected scope; and in response to said initialization request, initializing said target memory block within a memory of the data processing system to an initialization value.

2. The method of claim 1, wherein said initializing comprises initializing said target memory block without said cache memory holding a data-valid copy of said target memory block.

3. The method of claim 1, wherein said selecting is performed prior to said broadcasting, said method further comprising:

in response to receipt of an indication that an initialization request of said narrower scope is unsuccessful, said cache memory issuing said initialization request with said broader scope.

4. The method of claim 1, wherein:

said first coherency domain includes a domain indicator for said target memory block, wherein said domain indicator indicates whether said target memory block is cached, if at all, only within said first coherency domain; and said method further comprises updating said domain indicator in response to an indication that no data-valid copy of said target memory block remains cached outside of said first coherency domain.

5. The method of claim 1, wherein:

said cache memory comprises a first cache memory; and said initializing comprises initializing said target memory block to said initialization value in a second cache memory without initializing said target memory block in an underlying system memory.

6. The method of claim 1, wherein said initializing comprises:

initializing said target memory block to said initialization value in said cache memory in response to receipt of an indication that no other cache memory associated with another processor core will retain a data-valid copy of said target memory block.

7. A processing unit for a data processing system including at least first and second coherency domains, wherein said first coherency domain includes the processing unit and said second coherency domains includes another processing unit, said processing unit of said first coherency domain comprising:

at least one processor core; and a cache memory coupled to said processor core, wherein said cache memory, responsive to receipt from the processor core of an initialization operation indicating a target memory block to be initialized, determines a coherency state of said target memory block with respect to said cache memory and, in response to said determination, selects a scope of broadcast of an initialization request identifying the target memory block, such that said cache memory selects a narrower scope including said first coherency domain and excluding said second coherency domain in response to a determination of a first coherency state and selects a broader scope including said first coherency domain and said second coherency domain in response to a determination of a second coherency state, and wherein said cache memory broadcasts an initialization request with said selected scope, such that the target memory block is initialized within a memory of the data processing system to an initialization value.

8. The processing unit of claim 7, wherein said target memory block is initialized without said cache memory holding a data-valid copy of said target memory block.

9. The processing unit of claim 7, wherein the cache memory selects the scope prior to broadcasting the initialization request, and wherein said cache memory, responsive to receipt of an indication that an initialization request of said narrower scope is unsuccessful, issues said initialization request with said broader scope.

10. The processing unit of claim 7, wherein:
said processing unit includes a memory controller that maintains a domain indicator for said target memory block, wherein said domain indicator indicates whether said target memory block is cached, if at all, only within said first coherency domain; and
said memory controller updates said domain indicator in response to an indication that no data-valid copy of said target memory block remains cached outside of said first coherency domain.

11. The processing unit of claim 7, wherein:
said cache memory includes a data array,
said cache memory initializes said target memory block to said initialization value in said data array in response to receipt of an indication responsive to said initialization request that no other cache memory associated with another processor core will retain a data-valid copy of said target memory block.

12. A data processing system, comprising:
the said processing unit of the first coherency domain;
said second coherency domain;
an interconnect fabric coupling said processing unit of said first coherency domain and said second coherency domain;
wherein, responsive to said initialization request, another cache memory initializes said target memory block to said initialization value.

13. The data processing system of claim 12, and further comprising a system memory holding said target memory block, wherein said another cache memory, responsive to snooping said initialization request on said interconnect, initializes said target memory block to said initialization value without initialization of said target memory block in said system memory.

14. A program product, comprising:
a computer storage medium; and
program code encoded within said computer storage medium, wherein said program code, when processed, causes a computer system to perform steps of:
a processor core transmitting an initialization operation to an associated cache memory, said initialization operation indicating a target memory block to be initialized;
in response to receipt by the cache memory of the initialization operation, the cache memory determining a coherency state of said target memory block with respect to said cache memory;
in response to said determination, said cache memory selecting a scope of broadcast of an initialization request identifying the target memory block, wherein said selecting includes:
selecting a narrower scope including a first coherency domain and excluding a second coherency domain in response to a determination of a first coherency state; and
selecting a broader scope including said first coherency domain and said second coherency domain in response to a determination of a second coherency state;
said cache memory broadcasting an initialization request with said selected scope; and
in response to said initialization request, initializing said target memory block within a memory of the computer system to an initialization value.

15. The program product of claim 14, wherein said initializing comprises initializing said target memory block without said cache memory holding a data-valid copy of said target memory block.

16. The program product of claim 14, wherein the selecting is performed prior to the broadcasting and the steps further include:
in response to receipt of an indication that an initialization request of said narrower scope is unsuccessful, said cache memory issuing said initialization request with said broader scope.

17. The program product of claim 14, wherein:
said first coherency domain includes a domain indicator for said target memory block, wherein said domain indicator indicates whether said target memory block is cached, if at all, only within said first coherency domain; and
said program code further causes said domain indicator to be updated in response to an indication that no data-valid copy of said target memory block remains cached outside of said first coherency domain.

18. The program product of claim 14, wherein:
said cache memory comprises a first cache memory; and
said initializing comprises initializing said target memory block to said initialization value in a second cache memory without initializing said target memory block in an underlying system memory.

19. The program product of claim 14, wherein said initializing comprises:
initializing said target memory block to said initialization value in said cache memory in response to receipt of an indication that no other cache memory associated with another processor core will retain a data-valid copy of said target memory block.

* * * * *